(12) United States Patent
Jones et al.

(10) Patent No.: US 6,434,155 B1
(45) Date of Patent: Aug. 13, 2002

(54) WEIGHTED ROUND ROBIN ENGINE USED IN SCHEDULING THE DISTRIBUTION OF ATM CELLS

(75) Inventors: James W. Jones, Novato; Michael Nelson, Rohnert Park, both of CA (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 09/469,583

(22) Filed: Dec. 22, 1999

(51) Int. Cl.$^7$ ................................................ H04L 12/28
(52) U.S. Cl. ...................................................... 370/398
(58) Field of Search ........................ 370/398, 230–236, 370/412–414, 229, 503, 517, 319, 328, 443, 348; 709/226

(56) References Cited

U.S. PATENT DOCUMENTS

| | | | |
|---|---|---|---|
| 5,357,507 A | * 10/1994 | Hughes et al. | ............... 370/234 |
| 5,515,363 A | 5/1996 | Ben-Nun et al. | |
| 5,579,302 A | 11/1996 | Banks | |
| 5,579,312 A | 11/1996 | Regache | |
| 5,712,851 A | 1/1998 | Nguyen et al. | |
| 5,724,513 A | 3/1998 | Ben-Nun et al. | |
| 5,732,087 A | 3/1998 | Lauer et al. | |
| 5,742,765 A | * 4/1998 | Wong et al. | ................. 370/365 |
| 5,745,490 A | 4/1998 | Ghufran et al. | |
| 5,751,709 A | 5/1998 | Rathnavelu | |
| 5,793,747 A | * 8/1998 | Kline | .......................... 370/230 |
| 5,898,669 A | 4/1999 | Shimony et al. | |
| 5,914,934 A | 6/1999 | Rathnavelu | |
| 5,926,459 A | * 7/1999 | Lyles et al. | .................. 370/230 |
| 6,006,264 A | * 12/1999 | Colby et al. | ................. 709/226 |
| 6,011,775 A | * 1/2000 | Bonomi et al. | ............. 370/230 |
| 6,154,459 A | * 11/2000 | Wicklund | .................... 370/395 |
| 6,327,254 B1 | * 12/2001 | Chuah | ......................... 370/328 |

* cited by examiner

*Primary Examiner*—Kwang Bin Yao
*Assistant Examiner*—Prenell Jones
(74) *Attorney, Agent, or Firm*—Richard A. Mysliwiec; V. Lawrence Sewell

(57) ABSTRACT

A weighted round robin (WRR) engine includes components to arbitrate emission of ATM cells assigned to different flows. In one embodiment termed an inter-QoS WRR, the flows are linked to quality of service (QoS) parameters. A tag value is further assigned to each QoS parameter. Whenever the QoS is selected by the Inter-QoS WRR to have a flow emit an ATM cell, the tag value for the QoS is incremented by a weight assigned to the QoS. The QoS selected by the Inter-QoS WRR is the QoS with the lowest tag. If two or more QoSs are tied with the lowest tag, the highest numbered QoS is selected by the WRR.

3 Claims, 12 Drawing Sheets

| | CVT | QoS3 | QoS2 | QoS1 | QoS0 | COMMENTS |
|---|---|---|---|---|---|---|
| 1001 | 0 | 5 | 10 | 15 | 30 | QoS3 WON AND HAS ITS WEIGHT ADDED TO ITS TAG |
| 1002 | 5 | 10 | 10 | 15 | 30 | QoS3 WON BECAUSE IT WAS TIED WITH A LOWER PRIORITY QoS. |
| 1003 | 10 | 15 | 10 | 15 | 30 | QoS2 WINS BECAUSE IT HAS THE LOWEST TAG VALUE |
| 1004 | 10 | 15 | 20 | 15 | 30 | QoS3 WINS AGAIN BECAUSE IT IS TIED WITH QoS1 |
| 1005 | 15 | 20 | 20 | 15 | 30 | QoS1 WINS BECAUSE IT HAS THE LOWEST TAG VALUE |
| 1006 | 15 | 20 | 20 | 30 | 30 | QoS3 WINS THE TIE WITH QoS2 |
| 1007 | 20 | 25 | 20 | 30 | 30 | QoS2 WINS |
| 1008 | 20 | 25 | 30 | 30 | 30 | QoS3 WINS |
| 1009 | 25 | 30 | 30 | 30 | 30 | QoS3 WINS 4 WAY TIE |
| 1010 | 30 | 35 | 30 | 30 | 30 | REMAINING QoSs ARE SERVICED IN |
| 1011 | 30 | 35 | 40 | 30 | 30 | ORDER OF |
| 1012 | 30 | 35 | 40 | 45 | 30 | QoS RANKING |

FIG. 12

WEIGHTED ROUND ROBIN ENGINE USED IN SCHEDULING THE DISTRIBUTION OF ATM CELLS

BACKGROUND OF THE INVENTION

1. Field of the Invention

The present invention relates to a method for scheduling the emission of asynchronous transfer mode (ATM) cells from an ATM cell queuing device. More particularly, the present invention relates to a system for controlling the emission of ATM cells while maintaining a desired quality of service (QoS) for different signal traffic provided to a telephone service subscriber.

2. Background

The following description is intended to provide a context for a description of the invention, and is not intended to constitute an admission of prior art.

I. ATM Cells

The telecommunications industry has developed schemes for transmitting telephone signals in digital formats. In one format, termed time division multiplexing (TDM), plain old telephone (POTs) voice signals are provided in a digital format for transmission. In another format, the ATM format, broadband digital signals which are provided from computers or fax machines are configured for transmission. Separate transmission paths are typically provided for the ATM and TDM signals. In the future it is desirable to provide all signals in an ATM format to avoid the need for separate transmission paths and separate transmission equipment.

An ATM signal from a telephone service subscriber is divided into cells or packets, and cells from multiple sources and multiple destinations are asynchronously multiplexed together during transmission. ATM cells are multiplexed when transmitted from node to node in a network. In each node a network switch or queuing device selects both the order of transmission for cells and the next node to where the cell is retransmitted. It is desirable that network switches be capable of supporting network traffic of various characteristics including both Constant Bit Rate (CBR) traffic, with a fixed time guarantee for delivery, and Unassigned Bit Rate (UBR) traffic.

CBR traffic is needed to assure that POTs voice signals are transmitted without delays so that voice signals are not interrupted, and so that no delay is apparent to listeners receiving the signals. UBR traffic can experience delays, and is typically delivered in time frames based on an assigned Quality of Service (QoS). The QoS, for instance, can be based upon a rate a subscriber pays.

The structure of a typical ATM cell is depicted in FIG. 1. Each ATM cell is typically 53 bytes long, with 5 bytes reserved for a packet header to identify routing and other information for the cell payload data being transferred, and 48 bytes reserved for storing the ATM payload data. The generic flow control (GFC) of the header is used for identifying a user network interface (UNI) and can include bits for cell flow control. The Virtual Path Identifier (VPI) and Virtual Circuit Identifier (VCI) fields identify every circuit or node along a path which the cell is to be transferred. The Payload Type (PT) identifies the payload data as user data, OAM data, or resource management data. The Cell Loss Priority (CLP) indicates a priority for the cell used in scheduling transmission of the cell through a network. Header Error Check (HEC) bits are included for use in determining if transmission errors have occurred when the ATM cell is transferred. The Payload Bytes store the ATM cell data.

The header information of the ATM cell identifies a routing connection for the cell between two stations, also referred to as a Virtual Circuit (VC). To establish the VC, a first end station requests a connection to a second end station by submitting a connection request to a User to Network Interface (UNI) with the network. After the VC is established, the end stations exchange ATM cells with header information identifying the VC routing.

II. Quality of Service (QoS) Control

With ATM cells arriving at a node faster than the ATM switch can transmit other ATM cells out, the ATM switch must schedule the transmission of each cell. The cells are in general buffered at each switch in queues to accommodate congestion. Assuming no congestion, cells which are received from an incoming link at a switch are immediately transmitted over an outgoing link to another destination. When congestion occurs, cells are typically assigned a priority and stored in a first in first out (FIFO) queue by the priority. The queued cells are then transmitted in an order dictated by priority.

A desirable function of a switch or queuing device in an ATM network is to support the QoS for each VC to which the station is connected. The QoS identifies peak and average data rates for a service a user is assigned. To assure a constant bit rate is met for CBR traffic, the CBR traffic can be assigned to the highest QoS, while a user with an Unassigned Bit Rate (UBR) will have a rate controlled to be less than a peak value depending on its QoS parameter. The QoS parameters include Peak Cell Rate (PCR), Cell Delay Variation (CDV) Tolerance, and Sustainable Cell Rate (SCR). The PCR defines an upper bound on the cell rate of a VC connection. The SCR is an upper bound on the average cell transmission rate over the connection. For Constant Bit Rate (CBR) connections, usually attributed to premium rate services, no SCR is defined. The CDV tolerance parameter indicates the degree of distortion allowed in the interarrival time of cells on a requested connection.

An end node as well as an intermediate node for a VC may police traffic to ensure that a VC does not exceed the PCR or SCR for the QoS assigned to an ATM cell. If a node detects transmission rates in excess of the QoS for a VC, it can typically police traffic by discarding an ATM cell.

III. Network Channel Bank Structure

FIG. 2 shows components of an access network channel bank 10 used to distribute ATM signals to and from subscribers. The channel bank shown includes subscriber slots 12 for attachment of subscriber line cards 14. The line cards 14 provide signals to and from subscribers and can function to generate ATM signals from POT connections, such as from line 16, and further create ATM cells from signals generated from components such as personal computers on lines, such as line 18. Signals are provided on an interface bus 20 on a backplane to and from the line cards 14. The cell bus 20 is further connected to a channel bank control unit 22.

The channel bank structure also includes a transport slot 24 for connection of a transport card 26. The transport slot 24 is connected by a interface cell bus 29 to the bank control unit. The transport card 26 includes a cell bus interface buffer 28 for connecting to the cell bus 28, a multiplexer/demultiplexer 30 for connecting the cell bus interface buffer 28 to a buffer 32, and the buffer 32 further connects to multiple lines which are provided to an internet service provider (ISP).

The multiplexer/demultiplexer may be controlled by an ATM LAyer Solution (ATLAS) 34. Such an ATLAS chip is manufactured by PMC Sierra, Inc. The ATLAS 34 provides ATM header lookup to determine cell routing and also functions to police ATM traffic QoS parameters for a VC using a double leaky bucket method. The double leaky bucket system determines whether a VC assigned to the ATM cell exceeded the QoS parameters for the cell. To perform policing for the QoS parameters, the ATLAS 34 either drops the ATM cell or provides a note or tag with the cell header identifying the violation. ATLAS hardware to enable such policing is significant and includes counters, timers and control logic for each potential VC connection to a network station.

The channel bank control unit 22 includes components for routing ATM cells between the subscriber line cards and the transport card 24. The channel bank control unit 22 includes components such as Field Programmable Gate Arrays (FPGAs) along with buffer memories used for routing ATM cells.

It is desirable to provide circuitry in a channel bank control unit to control the transmission of ATM cells according to their QoS parameters so that QoS parameters are not exceeded and ATM cells are not dropped by a policing function, such as the policing carried out by ATLAS 34, in an end node. It is further desirable to provide circuitry in the channel bank control unit to control distribution of ATM cells to devices according to bandwidth allocated to the device. For instance, if the telephone on line 16 operates at a rate of less than 1 MHZ, while the computer on line 18 operates at a rate of more than 50 MHZ, it would be desirable to distribute ATM cells on line 18 at the 50 MHZ rate while holding the cells for line 16, if QoS parameter limits are not violated, rather than providing all of the cells on line 16 first while holding the cells on line 18.

SUMMARY OF THE INVENTION

In accordance with the present invention, a Weighted Round Robin (WRR) engine is provided in a scheduler system of a channel bank control unit with components which operate to control the transmission of ATM cells according to their QoS parameters. The WRR in accordance with the present invention can further distribute ATM cells to different subscriber devices according to bandwidth allocated to those devices.

The scheduler system in accordance with the present invention includes a number of port shapers. A port shaper can support a number of flows. A port shaper directs flows to a single subscriber. Each flow assigned to a port shaper identifies ATM cells which are to be distributed to each subscriber device, such as a telephone or computer.

The port shaper includes a number of time descriptors. Flows are linked to the time descriptors. The time descriptors are sequentially activated. When a time descriptor becomes active, a flow linked to the time descriptor can emit an ATM cell, and after emitting the cell the flow is relinked to subsequent time descriptors.

Multiple flows may be linked to the same time descriptor. Since only one flow can emit an ATM cell at a time, arbitration can be performed to determine which flow emits a cell. Such arbitration is performed by a WRR engine. A WRR engine in accordance with the present invention functions using QoS parameters and/or weighting to determine which flow linked to the time descriptor gets to emit a cell.

In one type of WRR engine, termed an Inter-QoS WRR, flows are linked to the time descriptors of the port shapers through their QoS parameters. A tag value is further assigned to each QoS parameter. The tag value is initially set based on a weight assigned to the QoS, and whenever the QoS is selected by the Inter-QoS WRR to have a flow emit an ATM cell, the tag value for the QoS is incremented by its weight.

When an arbitration request is placed to the Inter-QoS WRR, the QoS selected by the WRR is the one with the lowest tag value. If two or more QoSs are tied for the lowest tag value, the higher numbered QoS is selected by the WRR engine. Using the Inter-QoS WRR, a flow directed to a 50 MHZ device may be assigned a high weight while a flow directed to a 1 MHZ device may be assigned a low weight so that flows are more frequently selected for emitting ATM cells toward the 1 MHZ device. Further, bandwidth is also allocated by assigning higher QoS values to flows needing more bandwidth.

In another type of WRR engine, termed an Inter-Flow WRR, flows are linked to time descriptors of port shapers based on a tag-value assigned to the flow with a lowest tag value linked first. The flow linked first is chosen by the Inter-flow WRR to emit an ATM cell. The Inter-Flow WRR enables control of bandwidth for flows which are linked to the same QoS. The tag value for a flow is initially set based on a rate limiting increment (I) assigned to the flow and the tag is incremented by the increment (I) for the flow each time the Inter-Flow WRR selects the flow for emitting a cell. By setting the increment (I) for a flow, the frequency the flow emits ATM cells can be controlled relative to other flows, enabling control of bandwidth using the Inter-Flow WRR engine.

BRIEF DESCRIPTION OF THE DRAWINGS

The present invention will be described with respect to particular embodiments thereof, and references will be made to the drawings in which:

FIG. 12 illustrates operation of an Inter-QoS Weighted Round Robin (WRR) engine.

DETAILED DESCRIPTION

I. Single Channel Bank System

Figure 1:
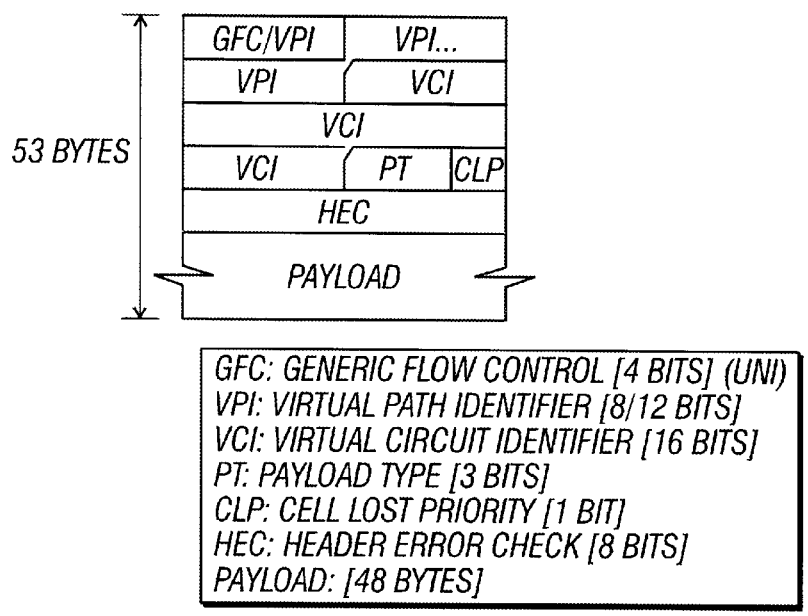
FIG. 1 shows the components of a standard ATM cell.
Figure 2:
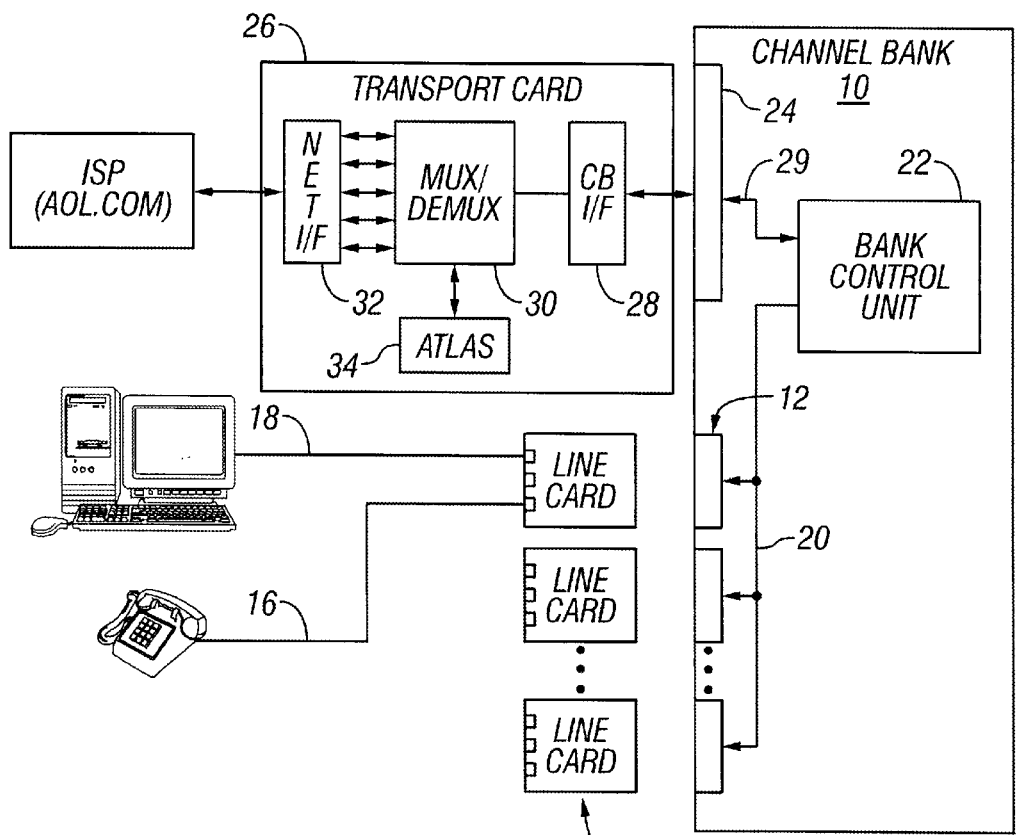
FIG. 2 illustrates components of a network including a channel bank with connected line cards and a transport card.
Figure 3:
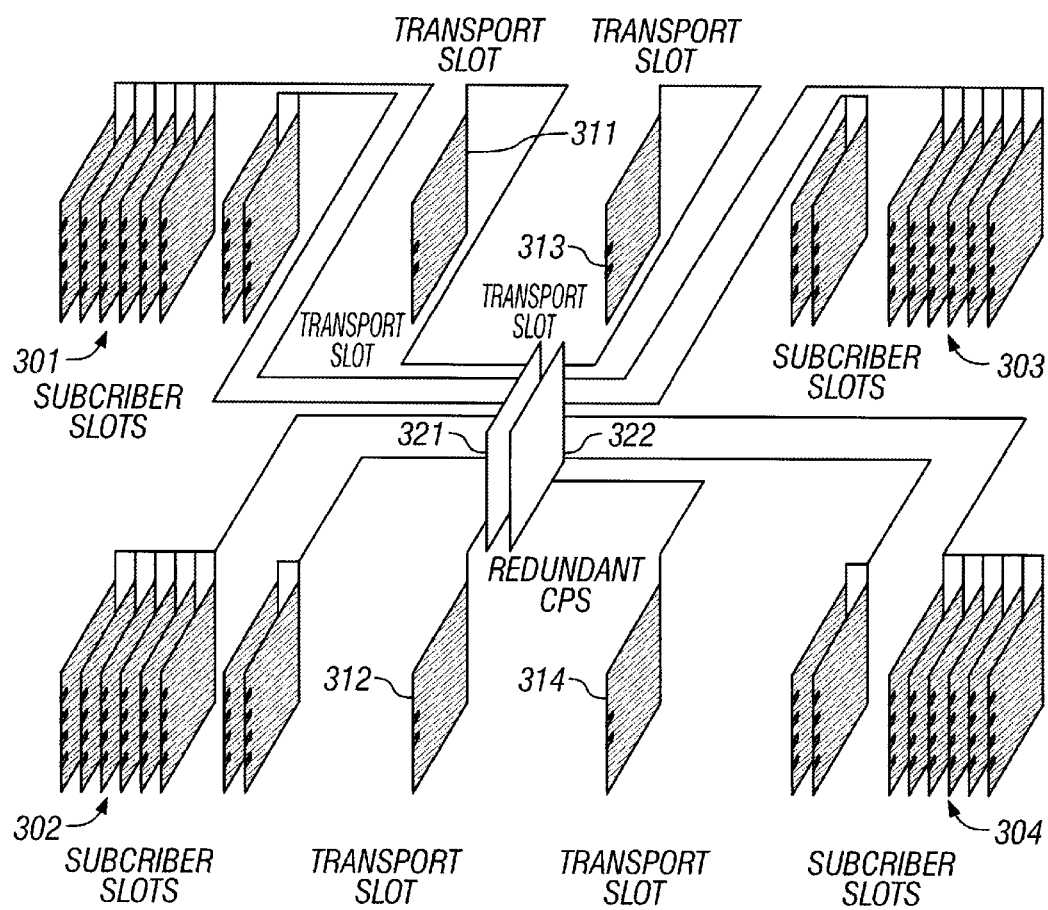
FIG. 3 shows components of a single channel bank system in accordance with the present invention.

FIG. 3 shows components of a single channel bank system in accordance with the present invention. The channel bank includes 32 subscriber slots divided into four groups (301–304) of eight slots, with the eight slots for each group divided into four slots connected to a first cell bus and two slots connected to a second. The channel bank also includes four transport card slots 311–314 and two Control Processors (CPs) 321–322. The two CPs 321–322 are cards provided in slots on the bank control unit backplane and can be designed to operate in a redundant configuration. Together the CPs form a bank control unit, such as the bank control unit 22 of FIG. 2.

ATM cells are transported from the subscriber slots to the CP slots via cellbus lines on the backplane. Either two or four subscriber slots share a cellbus. The transport card slots 311–314 each connect to the CPs via a dedicated cellbus.

II. Multi-Bank System With Stackplane Interface

Figure 4:
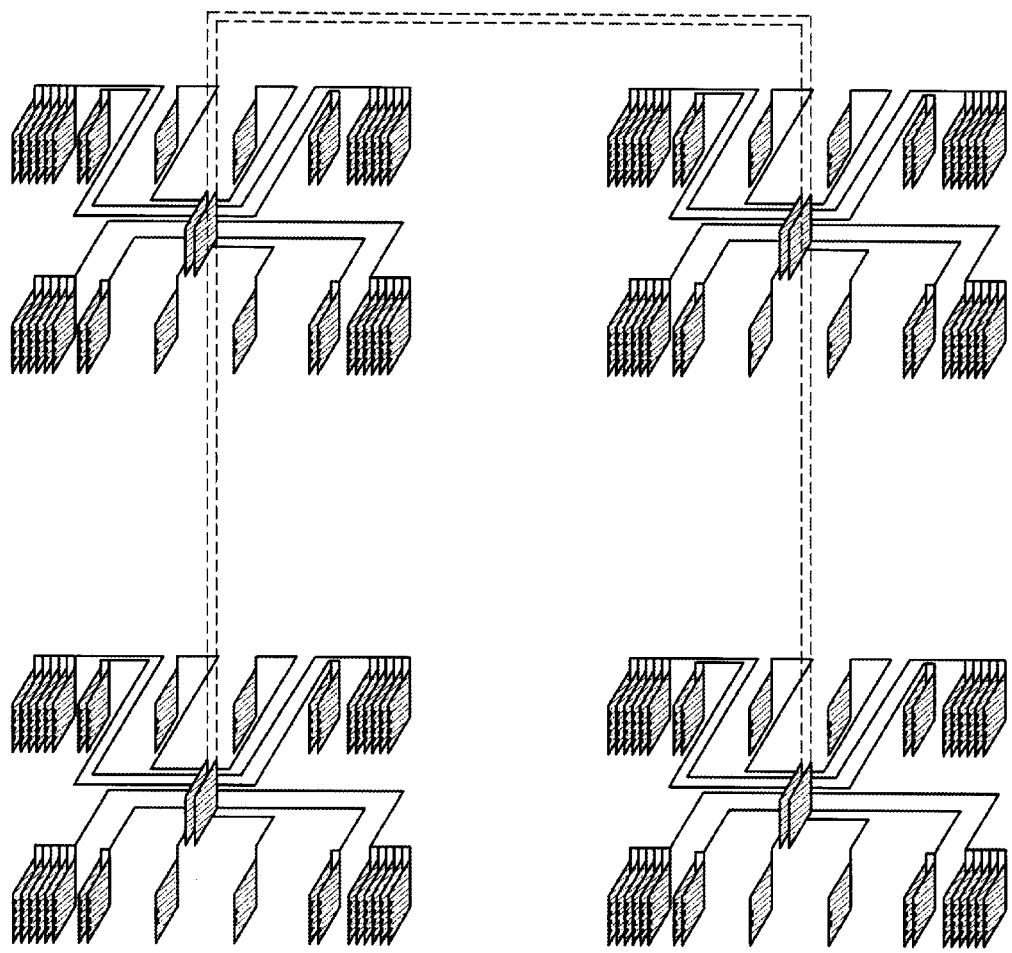
FIG. 4 shows components of a multi-bank system connected using a stackplane.

FIG. 4 shows components of a multi-bank system made up of 4 single bank units connected via a stackplane. With a stackplane, transport card data is presented to the ATM fabric of the CPs of a bank. A bank map in the header of an ATM cell indicates if the cell is destined for the bank where it enters, or to a subtending bank. If a cell is destined for a subtending bank, it bypasses the fabric of the initial bank and distributed to the subtending banks via the stackplane. Cells from the stackplane are only accepted into banks designated by their headers, and banks which are not designated will not accept the cell. If the cell is not destined for a subtending bank, it is routed through the ATM fabric of the initial bank and distributed to an appropriate subscriber.

III. Channel Bank System For ATM Max And ATM Min Modes

In accordance with the present invention, two separate modes of transmission of data through the CPs are provided, termed a ATM Max Mode and an ATM Min Mode. The ATM Max Mode channel bank configuration is illustrated in FIG. 5, while the ATM Min mode channel bank configuration is illustrated in FIG. 6.

Figure 5:
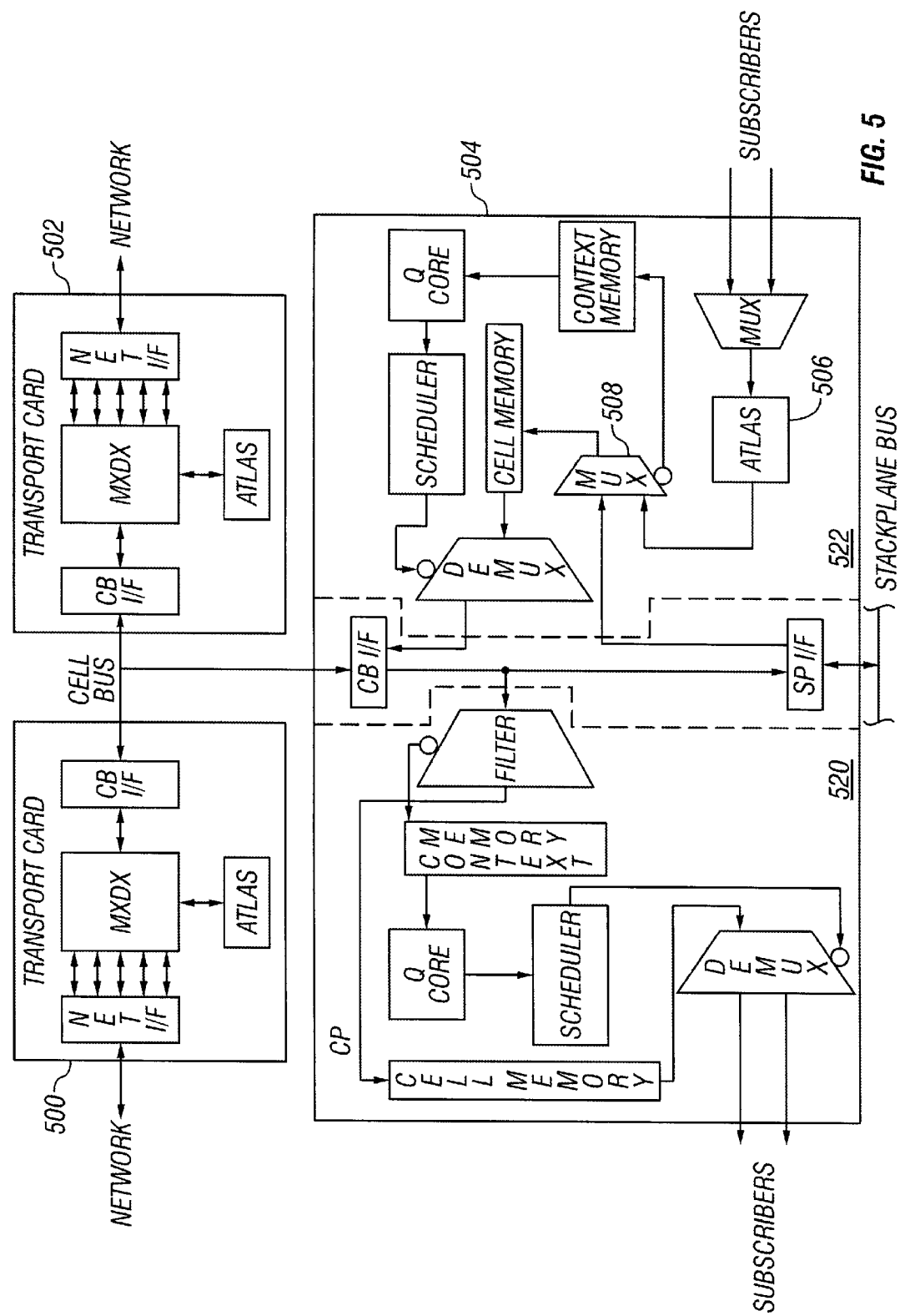
FIG. 5 shows an ATM Max Mode channel bank configuration.

In the ATM Max mode configuration of FIG. 5, transport cards 500 and 502 use an ATLAS to provide ingress policing and lookup functions so that when cells are received on the CP 504 from a transport card, they do not need to pass through an ATLAS and can proceed to subsequent stages. The ATM Max Mode configuration provides an ATLAS 506 for upstream traffic, where upstream traffic is defined as transmission in the direction from one of the subscriber line cards through the CP 504 to the transport line cards 500 and 502, and the downstream traffic is defined as transmission in the direction from the transport line cards 500 and 502 through the CP 504 to the subscriber line cards. With the ATM Max Mode configuration of FIG. 6 downstream traffic is handled by the circuitry 520 of the CP, while upstream traffic is handled by the circuitry 522.

Figure 6:
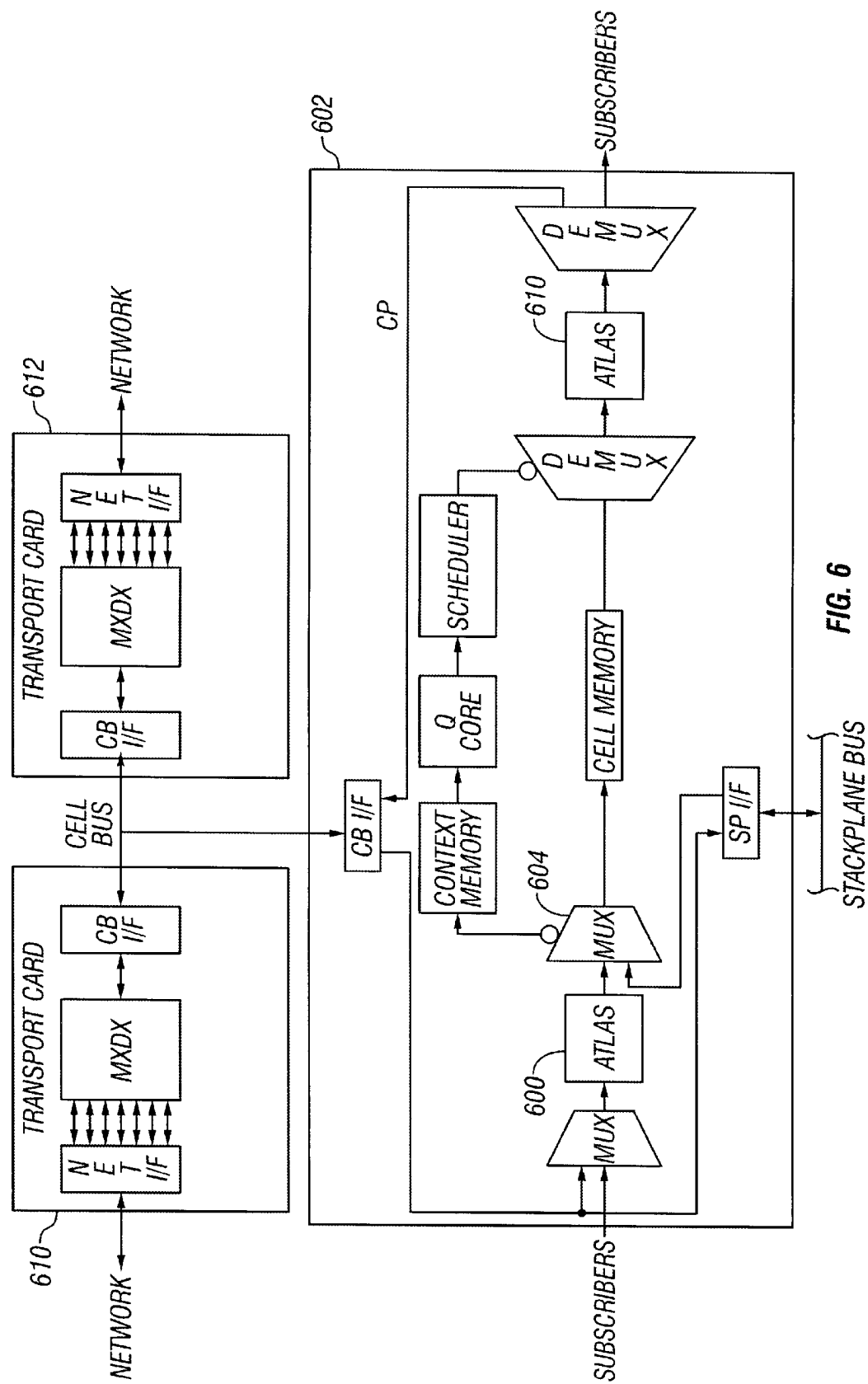
FIG. 6 shows an ATM Min Mode channel bank configuration.

The ATM Min Mode configuration of FIG. 6 provides lower cost transport cards 610 and 612 because the ATLAS 600 and the ATLAS 610 in the CP 602 perform policing for both downstream and upstream traffic. No ingress policing is required from an ATLAS on the transport card, so the transport cards 610 and 612 do not include a connection to an ATLAS.

IV. Channel Bank CP Structure

Figure 7:
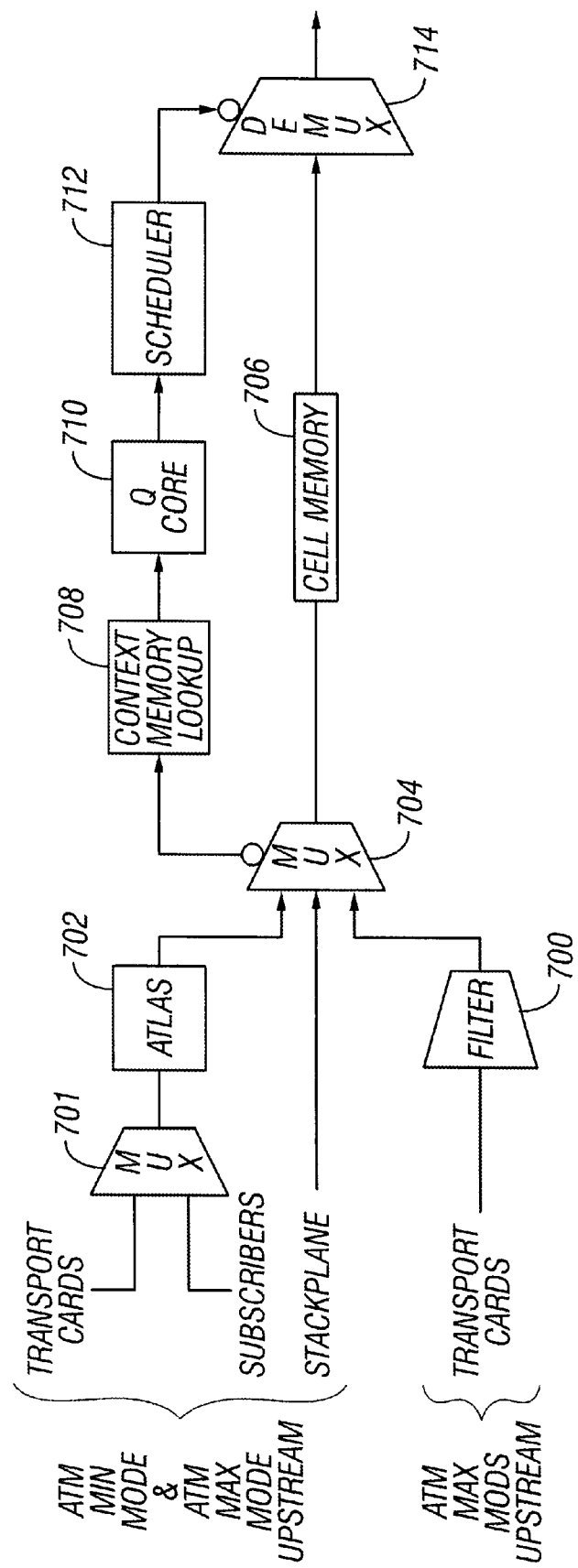
FIG. 7 shows a control processor (CP) structure for a channel bank in accordance with the present invention.

A control processor (CP) structure for a channel bank in accordance with the present invention is shown in FIG. 7. Alternative components for the ATM Max Upstream, ATM Max Downstream, and ATM Min Mode are shown to show how ATM cells are provided to a multiplexer 704 in the different modes. For the ATM Max Downstream Mode where ATM cells are provided to an ATLAS in the transport cards, the ATM cells are provided through a filter 700 for header lookup and bypass any ATLAS such as ATLAS 702 before reaching multiplexer 704. For ATM Min Mode signals and ATM Max Upstream mode where no ATLAS is provided for the transport card signals or subscriber card signals, the ATM cells are provided through multiplexer 701 and ATLAS 702 to the multiplexer 704. The stackplane bus data provided to the CP in the ATM Min Mode and to the Upstream portion of the ATM Max Mode does not require either filtering or an ATLAS, so the stackplane data is provided directly to the multiplexer 704 in FIG. 7.

The CP processes a single aggregate of cell traffic, so all input traffic is multiplexed using multiplexer 704 to create a common cell stream. The multiplexer 704 further provides ATM cell information through a context memory lookup 708, queuing core 710, and a scheduler 712. The output of the scheduler 712 drives demultiplexer 714 which outputs ATM cells from the cell memory 706 based on information from the scheduler 712.

A. Filtering

Cells entering the CP from transport cards which have already been policed by an ATLAS in the transport cards are filtered in filter 700 in the CP based on the bank ID found in the ATM cell header. If the corresponding bank ID bit is set, the filter presents the cell along with a flow ID for the cell to subsequent sections of the CP for processing. The flow ID identifies routing for the ATM cell to a particular device. For instance, ATM cells carrying standard telephone voice signals for a first subscriber line will be assigned a flow ID in common with all ATM cells directed to the first subscriber line. A computer line for the same subscriber will be assigned a second flow ID, and all ATM cells assigned to that computer line will be directed to that flow ID.

B. ATLAS

The ATLAS 702 provides header lookup, as well as policing functions for ATM cells arriving from devices which do not use an ATLAS. During header lookup if the corresponding bank ID bit is set in the header for the ATM cell, the ATLAS 702 provides the ATM cell data along with a flow-ID for the ATM cell to subsequent sections of the CP, similar to the filter 700.

C. Cell Memory

The ATM cell memory 706 of FIG. 7 stores the header and payload data for the ATM cells received from the multiplexer 704. The multiplexer 704 further provides the flow ID information to a context look up memory 708. Flow ID and flow context information for each ATM cell is then provided through the queuing core 710 and scheduler 712 of the CP. When a flow is eligible to have a cell emitted as determined by the scheduler 712, the ATM cell identified by the flow ID is retrieved from the cell memory 706 and the ATM cell is transmitted out from the multiplexer 714.

D. Context Memory

With the ATM cell data being stored in the cell memory 706, a lookup is further performed in a context memory to retrieve flow context information identified by the flow-ID for a cell. The context information is then used by the Q-Core and scheduler for further processing. The context information includes a QoS indication for the particular flow, weighting and rate limiting increments (I) for the flow, as well as an identity of one or more port shapers in the scheduler where the flow is to be linked.

E. Queuing Core

Figure 8:
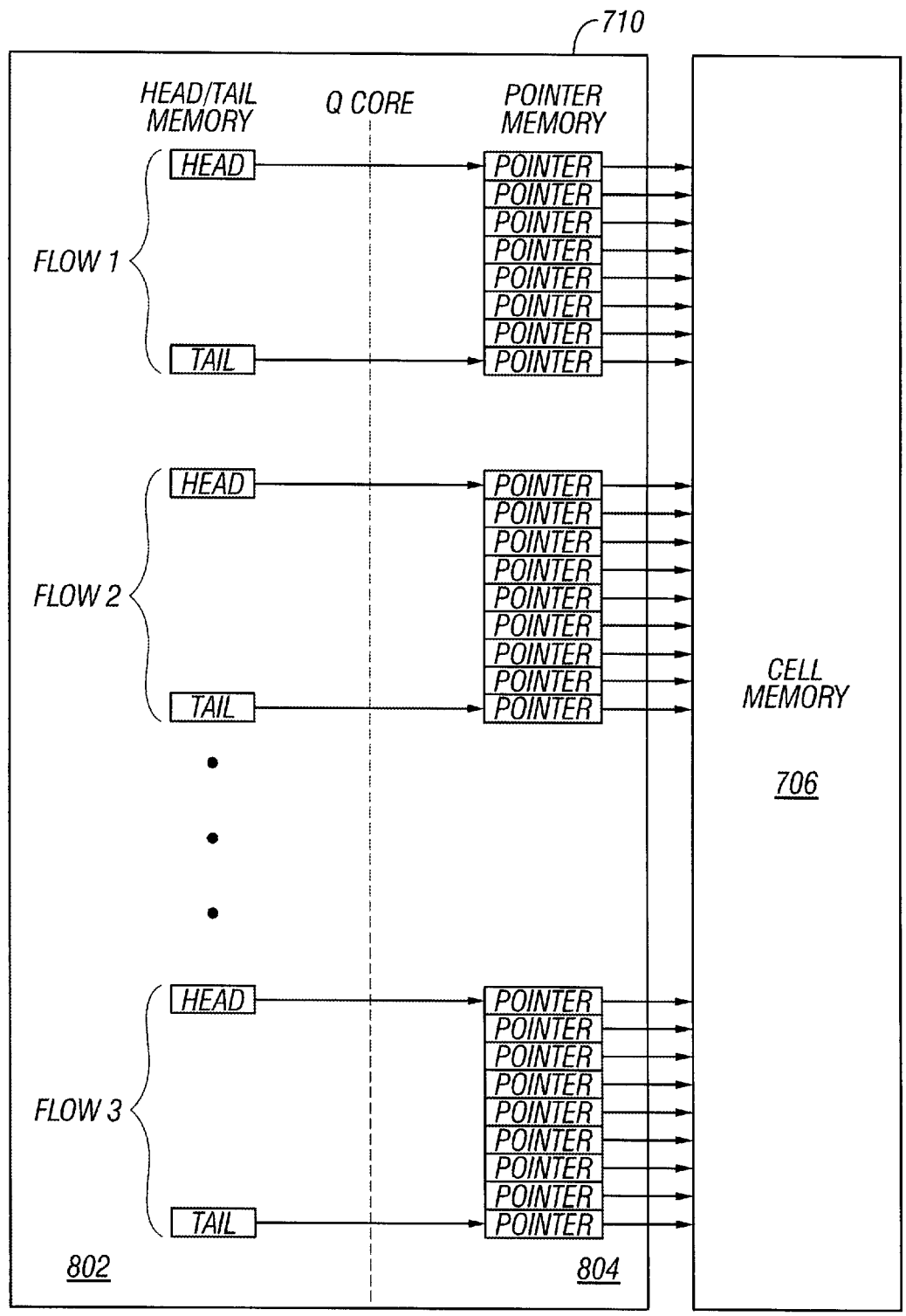
FIG. 8 shows a structure for the queuing core for the CP of FIG. 7.

The structure for a queuing core 710 of FIG. 7 is illustrated in FIG. 8. The queuing core 710 manages ATM cells for a number of flows. The queuing core 710 includes a head/tail memory 802 and a pointer memory 804 as shown in FIG. 8. A freelist is also associated with the queuing core, although not shown in FIG. 8. The Q Core identifies ATM cells stored in the cell memory 706, also shown in FIG. 7.

When a flow ID for an ATM cell is admitted into the queuing core 802, a pointer from the freelist is provided to identify the stored cell. The pointer indicates an address in the cell memory 706 where the ATM cell data was stored. A tail pointer for the flow ID for the cell is further identified in the head/tail memory 802. The tail pointer indicates where the last pointer in the pointer memory for the flow queue is located. The next location in the pointer memory 804 after the pointer identified by the tail pointer is where the pointer supplied with the flow ID is to be addressed and the ATM cell data stored. Once the pointer is addressed and the cell data stored, the tail pointer in the head/tail memory is updated with the new tail location. For an ATM cell assigned to a flow ID which does not have other ATM cells queued in the Q Core 802, the pointer obtained from the new flow ID is used to initialize the head/tail pointer. With only one pointer for the flow ID, the head and tail pointers in the head/tail memory 802 for the flow will both identify the one pointer.

When a cell is to be dequeued, the head pointer is looked up in the head/tail memory 802 as identified by the cell flow ID. The head pointer identifies a location in the pointer memory 804 that contains the next cell to be dequeued from a flow. While the cell is retrieved from the cell memory 706, the head pointer for the flow is updated with the next subsequent memory location in the pointer memory. The new head pointer will identify the location of the next cell to be emitted from the flow queue.

F. Scheduling

The scheduler 712 of FIG. 7 includes components that determine which flow ID identified in the Q Core 710 gets to emit an ATM cell and when. The components include a Scheduler with an integrated Weighted Round Robin (WRR) engine which is described in detail in the following sections.

1. Scheduler

Figure 9:
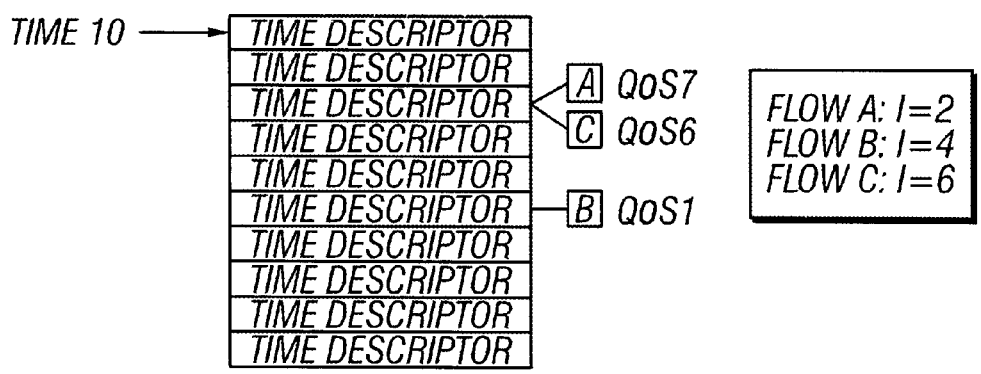
FIG. 9 illustrates the configuration of a port shaper for a scheduler of the CP of FIG. 7.

The scheduler system includes a number of port shapers. A port shaper can support a number of flows. In one embodiment of the present invention, each port shaper directs flows to a single subscriber. A subscriber may have several devices, such as a telephone which requires CBR traffic, and a computer which can tolerate UBR traffic. Each flow assigned to a port shaper directs ATM cells to a different device used by a subscriber. FIG. 9 illustrates the configuration of a port shaper.

A port shaper includes a number of time descriptors. The time descriptors are sequentially activated. A time-ID indication has an arrow pointing to the time descriptor identified as active. Flows, such as A-C are linked to the time descriptors. Each flow has an associated QoS. When a time descriptor becomes active, a flow linked to the time descriptor can emit a cell and is then relinked to subsequent time descriptors based on information from the context memory. A flow directed to a 50 MHZ device may be assigned a weighting or increment value I so that it is reassigned to the next sequential time descriptor after emitting a cell, while a flow directed to a 1 MHZ device can have a weighting set so it is assigned 50 time descriptors down from the active time descriptor to accommodate different device operation speeds.

Multiple flows, such as A and C in FIG. 9 may be linked to the same time descriptor. Since only one flow may be emitted at a time, when multiple flows are assigned an active time descriptor, arbitration must be performed to determine which flow emits a cell. Such arbitration is performed in accordance with the present invention using weighted round robin (WRR) engines which are described in detail to follow.

FIGS. 10A–F illustrate operation of a port shaper which is scheduling emission of flows A–E. A time-ID arrow indicates which time descriptor is active and may have flows linked which are eligible for emitting a cell. After a time descriptor becomes inactive, the link ID arrow points to the next active time descriptor which may have flows eligible for emitting a cell.

Figure 10A:
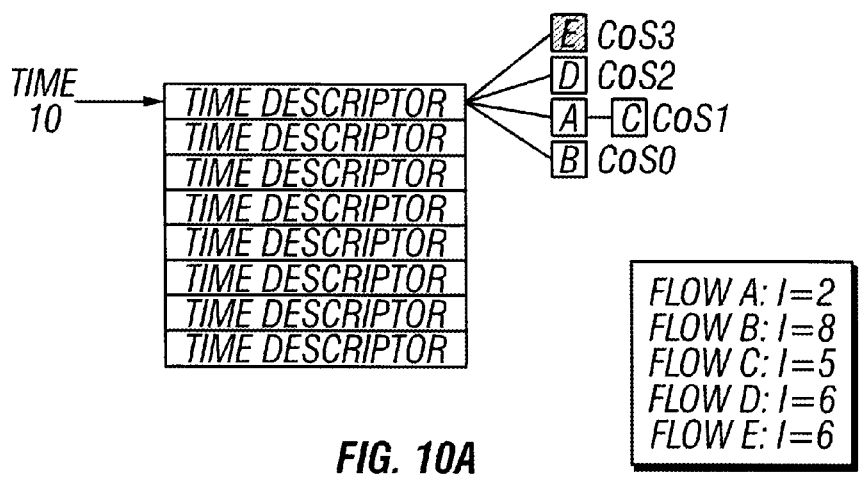
FIGS. 10A–F illustrate operation of a port shaper.

Referring to FIG. 10A, all five flows A–E are linked to the same time descriptor and the time descriptor is the active time descriptor referenced by the ID indicator arrow, so all flows are eligible for emitting a cell. Since multiple flows are linked to the active time descriptor, a request is placed to a WRR engine to arbitrate which flow is eligible to emit a cell. The WRR engine selects flow E as indicated by highlighting based on criteria which is discussed subsequently with respect to the function of WRR engines.

After emitting a cell, flow E is relinked, assuming there are more cells in flow E's queue, in the queuing core. Flow E is relinked at the time descriptor for its emission plus a rate limiting increment I, which for E is 6. All the losing flows A–D are relinked to the next sequential time descriptor.

Figure 10B:
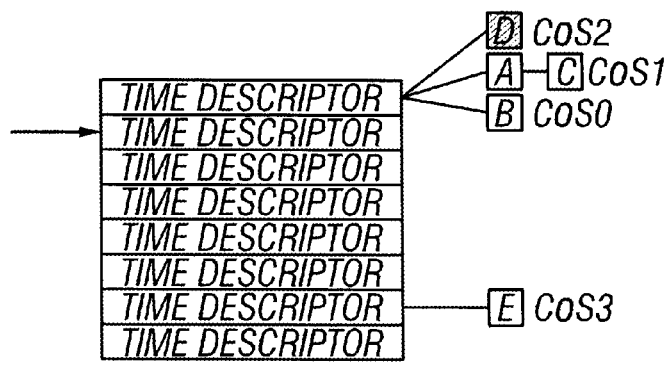

Referring to FIG. 10B, when the port shaper is evaluated again, the time ID indicator is moved to a next subsequent time descriptor. Since flows A–D are all linked to this time descriptor, a new WRR request is submitted. As indicated by hatching, the flow D is selected by the WRR for emission. After emission, flow D is relinked at a time descriptor based on its increment I=6. The losing flows A–C are then relinked to the next sequential time descriptor.

Figure 10C:
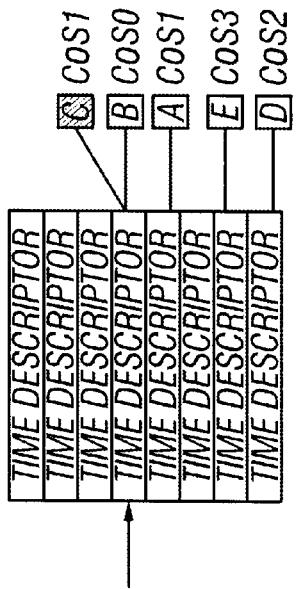

In FIG. 10C, when the port shaper is evaluated again, and a WRR request is placed to arbitrate emission of flows A–C. As indicated, flow A is selected. After emission, flow A is relinked at the time descriptor plus its increment I of 2, and flows B–C are relinked to the next sequential time descriptor.

Figure 10E:
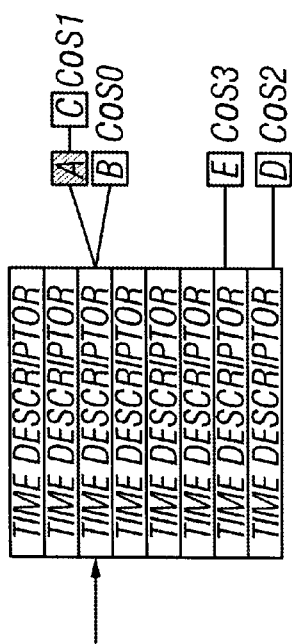
Figure 10D:
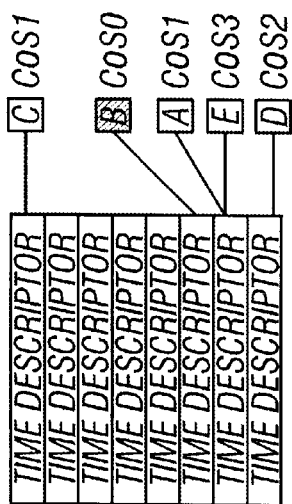

In FIG. 10D, a WRR request is placed to arbitrate emission of flows B and C. Flow C is selected for emitting a cell, and after emission is relinked to the time descriptor plus its increment of 5. Because only 4 time descriptors are available sequentially after the active time descriptor, flow C is rolled over to a head time descriptor for the port shaper as shown in FIG. 10E. Flow B is relinked to a next subsequent time descriptor, which is now also the time descriptor where flow A is linked, as shown in FIG. 10E.

When the port shaper is evaluated at the next time descriptor shown in FIG. 10E, a WRR request is placed to arbitrate emission of flows A and B. Flow A is selected for emitting a flow, and after emission is relinked two time descriptors down based on its increment of I=2. Flow A and E will then be linked to the same time descriptor, as shown in FIG. 10D. The losing flow B is then relinked to the next sequential time descriptor.

Figure 10F:
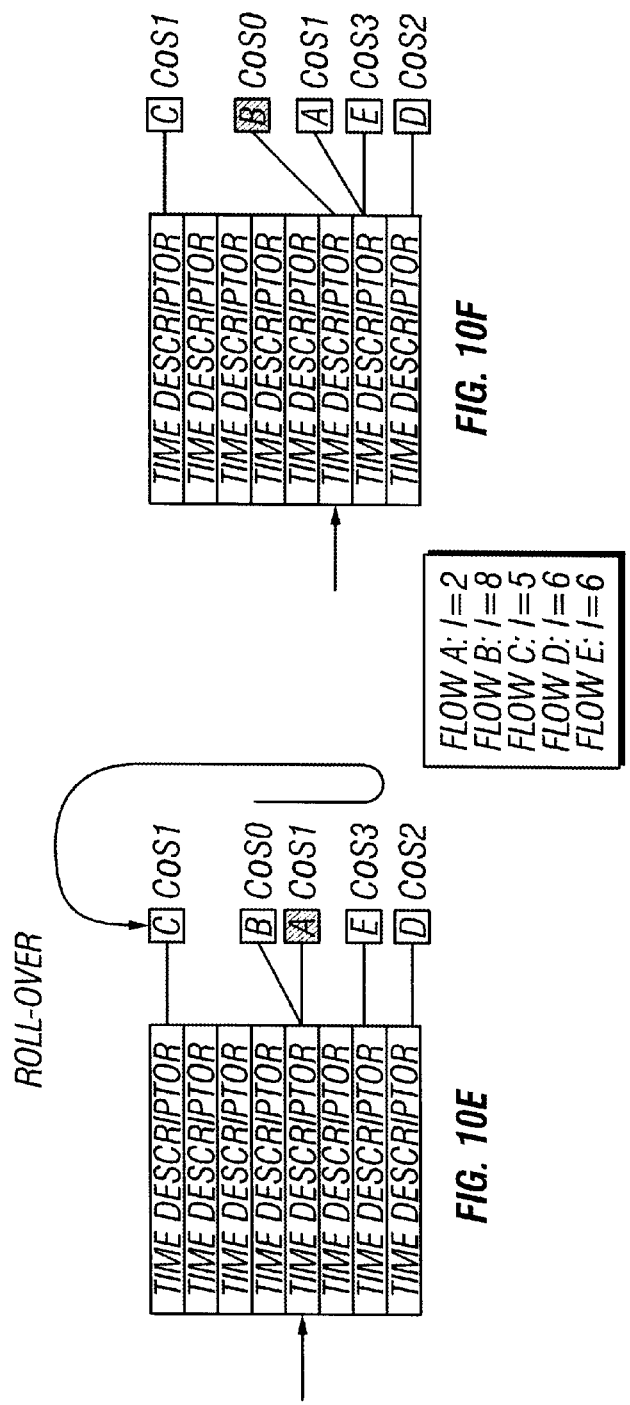

When the port shaper is evaluated at the next time descriptor shown in FIG. 10F, flow B is the only flow eligible for emission, so no WRR request is necessary. After emission of a cell, flow B is relinked to the time descriptor plus its increment of 8, and operation of the scheduler for this port shaper continues.

With only one bus line carrying ATM cells out of the CP and multiple port shapers emitting ATM cells from flows, the scheduler system is used to prevent multiple flows from being emitted from separate port shapers at the same time.

Figure 11:
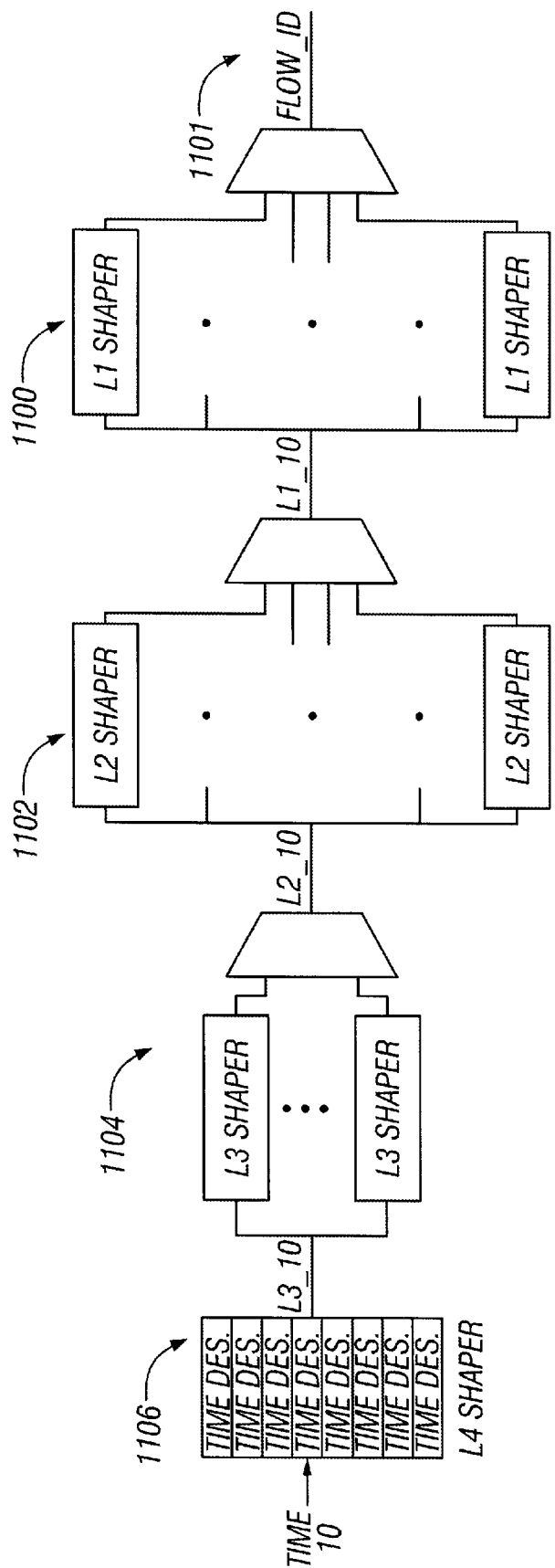
FIG. 11 shows a scheduler configuration which includes a hierarchy of port shapers.

In one embodiment of the present invention, such a scheduler can be formed using a hierarchy of port shapers as illustrated in FIG. 11. In the hierarchical scheme of FIG. 11, a large number of the L1 port shapers 1100 individually provide flow IDs to a single bus 1101, while other port shapers such as the L2–L4 shapers schedule emission of flows from the L1 port shapers 1100. The L2 port shapers 1102 schedule which of the L1 port shapers 1100 get to emit the next flow, the L3 port shapers 1104 schedule which of the L2 port shapers 1102 is active next, and the L4 port shaper 1106 schedules which of the L3 port shapers 1104 is next active. As an example, the scheduler system of FIG. 11 might include 512 L1 shapers, 16 L2 shapers, 3 L3 shapers and a single L4 port shaper to control flows from 512 L1 shapers onto the single bus 1101.

With the L2 shapers 1102 used to schedule which L1 port shaper provides a cell onto a bus, the L2 port shapers will store and emit L1 port shaper IDs. The L3 shapers may be used if the single bus 1101 feeds multiple buses and it is desirable to allocate different bandwidths to the multiple buses. The L3 shapers emit data to identify which L2 port shaper can emit an output to control the bandwidth of signals emitted to different busses. Finally, the L4 shaper may be used if an ATLAS is provided after the demultiplexer 714 shown in FIG. 7 to control cell emission, and the ATLAS has a maximum throughput which limits its output speed. The L4 port shaper 1106 would then emit data to identify which L3 port shaper can emit an output to control the bandwidth of signals emitted to the ATLAS. Depending on scheduling requirements, a system might use only L1 and L2 port shapers, L1–L3 port shapers, or more than the four L1–L4 port shapers to schedule emission of flows.

With hierarchical port shapers as shown in FIG. 11 used in a scheduler system, the port shapers L2–L4 controlling the L1 port shapers 1100 will function in a similar way to the L1 port shapers as illustrated in FIGS. 10A–10F. Instead of flows, however, the port shapers controlling the L1 port shapers will emit port shaper IDs. For example, an L2 port shaper will link L1 port shaper identifications to the time descriptors of a port shaper. Rate limiting increments (I) can be assigned to each of the L1 port shaper IDs to control the rate at which the L1 port shaper's time ID indicator is advanced. If two flows are allocated to a single time descriptor which is active for emitting flows, a WWR engine can be placed to determine which L1 port shaper ID is emitted. L3 and L4 port shapers can function similar to the L2 port shaper, by linking subsequent port shaper IDs to time descriptors and assigning increments to control port rates.

2. WWR Engines

A WRR engine arbitrates which flow is emitted from a time descriptor when multiple flows are linked to a single active time descriptor. The criteria used by the WRR engine to determine the winning flow can be varied to accommodate overall system requirements. Two WRR engine formats, an Inter-QoS WRR and an Inter-flow WRR are described in the following sections.

i. Inter-QoS WRR

With an Inter-QoS WRR, arbitration is performed using QoS indications to allow a fair sharing of the available bandwidth from any given port shaper. FIG. 12 provides a table showing tag data for four QoS indications, QoS0–QoS3, a current virtual time (CVT) indication, and comments relating to the WRR function for the Inter-QoS WRR.

For the Inter-QoS WRR, a QoS becomes active when a flow linked to the QoS is initially assigned to a port shaper. An initial tag for the QoS for the flow is set to the CVT when the tag becomes active plus a weight assigned to the QoS. In the example of FIG. 28, it is assumed that the four QoSs become active at the same time at CVT=0, so their initial tags values are all equal to their weights.

In accordance with the Inter-QoS WRR method, a QoS with a flow chosen for emission is the QoS with the lowest tag value. In the event that two QoSs have the same numerical tag, the higher number QoS wins and has a flow emit a cell. The winning QoS has its weight added to its tag.

If multiple flows are linked to the same QoS, the flows can be scheduled for emission of cells using one of a number of options. After emitting a cell, or upon becoming active, a flow can be linked either to the head or the tail of the QoS link. If linked to the head, one flow can potentially dominate the bandwidth for the QoS. If linked to the tail, bandwidth will be equally allocated irrespective of the need for bandwidth which one flow may have with respect to another. In another option, a weighting can be assigned separately to the flows to determine where in the QoS link chain it should be reassigned. More detail of how such weighting can be done is described in the Inter-Flow WRR section to follow.

In the example in FIG. 12, each row shows the tag value for each QoS, and a CVT value when a WRR request is submitted. For every row it is assumed that each of QoS0–QoS3 are active and linked to the time descriptor when the WRR request is submitted. Each of the flows QoS0–QoS3 is then eligible for emitting a cell from a flow.

In row 1001, as indicated above, it is assumed that all of the QoSs, QoS0–QoS3 have become active at CVT=0, so their tag indicates their weight value. Since QoS3 has the lowest tag value, the WRR chooses the next flow linked to QoS3 for emitting a cell, as indicated by the hatching of the tag value 5 under QoS3. After emission, QoS3 has its weight added to its tag to create a tag value of 10 as shown at row 1002.

In row 1002 when another WRR request is submitted, QoS2 and QoS3 are tied for emission consideration with the lowest tag value. Since QoS3 is the higher numbered QoS, the WRR chooses QoS3 for emitting a cell, as indicated by hatching. After emitting a cell, the weight of 5 for QoS3 is added to its tag value for a total value of 15 as shown in row 1003.

In row 1003 when another WRR request is submitted, QoS2 has the lowest tag value and is chosen by the WRR to emit a cell as indicated by hatching. After emission, QoS2 has its weight of 10 added to its tag to create a tag value of 20 as shown at row 1003.

In row 1004 when another WRR request is submitted, QoS3 and QoS1 are tied with a value of 15. Since QoS3 is the higher numbered QoS, the WRR chooses QoS3 for emission of a cell and its weight is added to its tag as shown in row 1005. In row 1005, the QoS1 wins and emits a flow, and has its weight of 15 added to its tag to create a tag value of 30. In row 1006, the QoS2 and QoS3 have the same numerical tag value, but QoS3 is selected for emission because it is a higher numbered QoS. In row 1007 QoS2 is selected by the WRR since it has the lowest numbered tag value, and in row 1008 QoS3 is selected-since it has the lowest numbered tag value.

In row 1009, a four way tie occurs since all of the QoSs have a numerical tag value of 30. QoS3 wins the four way tie since it is the higher numbered QoS. In lines 1010–1012, each of QoS2–QoS0 are serviced in the order of their ranking.

Note that the CVT is incremented to match the tag value of the winning QoS. The CVT is added to the weight of a newly active QoS to create a tag value which roughly corresponds to the tag values of the active QoS indicators. In this manner, when a QoS becomes active after a number of QoS values have been active for a considerable amount of time, the newly active QoS will not continually win emission until its tag value is increased to match other QoS tag values, so overall bandwidth will be more equally allocated.

Although the CVT is added to the tag value of a newly active QoS for the example of FIG. 12, a person of ordinary skill in the art might determine the initial tag value in another way. For instance, the initial tag value might be the weight for the QoS plus the tag value of the last QoS having a cell emitted. The initial tag might also be the weight for a QoS plus an average value of all active QoS indicators. The initial tag value might also be another arbitrary value depending on desired emission requirements to create a desirable Inter-QoS WRR.

Using the Inter-QoS WRR engine described with respect to FIG. 12, the bandwidth allocated to each QoS can be set according to the weights assigned. Assuming that Ra, Rb, Rc and Ri are weights assigned to the QoSs, and BW is the indicated bandwidth, the bandwidth associated with a QoS having the weight Ri can be expressed as follows:

$$BWi=BWtotal*(1/Ri)/(1/Ra+1/Rb+1/Rc+1/Ri)$$

ii. Inter-Flow WRR

An Inter-Flow WRR allows for the existence of different rate flows within the same QoS. For an Inter-Flow WRR, a flow's increment value (I) is added to a CVT to create an initial tag weight.

The Inter-Flow WRR is only accessed when a QoS is linked to an active time descriptor, and the QoS is oversubscribed. Being oversubscribed indicates that the QoS has more than one flow linked. In an under subscribed case, flows would settle into their own time descriptors and there would be no reason to use the WRR.

In an oversubscribed case, it is possible to have more bandwidth allocated for each flow than is available. As indicated previously, if flows are always relinked at the tail of a QoS link the result would be a WRR emission pattern with no rate discrimination, and if flows emitted are always relinked at the head of a QoS link the result would be that a flow first linked to the QoS could monopolize its available bandwidth. In accordance with the present invention dynamic weighting using the tags is utilized and the flows which are emitted are relinked to the QoS based on their tags value, rather than being arbitrarily linked to either the head or tail of a QoS link. The flow with the lowest tag will then find its way to the head of the QoS link and sharing of available bandwidth can be controlled based on weighting.

FIGS. 13A–13E illustrate operation of the Inter-Flow WRR of the present invention. For FIGS. 13A–13E it is assumed that two flows, labeled flow A and flow B, are active. Further, it is assumed that flow A is assigned an increment weighting value I=1 and flow B is assigned an increment weighting value I=2 because more bandwidth is desired for flow A. In FIGS. 13A–13E, hatching indicates which flow is the winner and gets to emit an ATM cell.

Figure 13A:
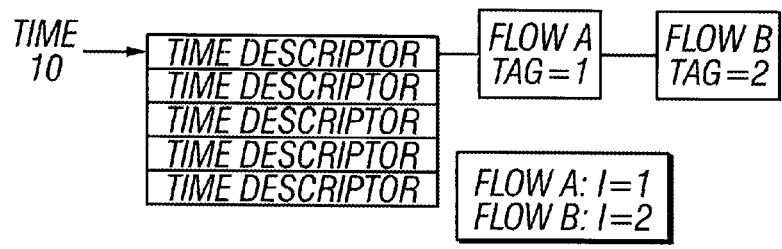
FIGS. 13A–E illustrate operation of an Inter-Flow WRR engine.
Figure 13B:
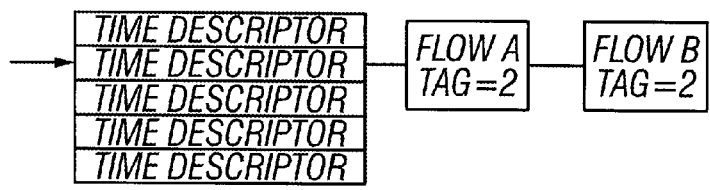

In FIG. 13A, a WRR request is submitted by the scheduler at the active time descriptor indicated by the arrow to arbitrate emission for flow A and flow B. For FIG. 13A it is assumed that flow A and flow B both become active at a CVT of 0, so their tag value is equal to their increment. In accordance with the Inter-Flow WRR procedure, since flow A has the lower tag value it is linked ahead of flow B. For flows with equal tag values, the flows are linked in the order that they are submitted to the time descriptor.

When the WRR request is placed for FIG. 13A, flow A which has the lowest tag value of 1 is selected by the Inter-Flow WRR for emitting a cell. The flow A is then relinked its increment value of sequential time descriptors forward. Since for flow A I=1, it is relinked to the next sequential time descriptor. The tag value for flow A is further increased by its increment value of I=1 to create a tag value of 2. Flow B which is not selected for emission is then relinked to the next sequential time descriptor. Flow B which has a tag value of 2, which is equal to flow A, is linked behind flow A to the next sequential time descriptor since it has a weight increment value which is higher than flow A. If flow A and flow B had both equal tags and equal weight increments, then they could be relinked according to a user chosen criteria, such as by which flow became active first, or depending on which flow last won emission.

Figure 13C:
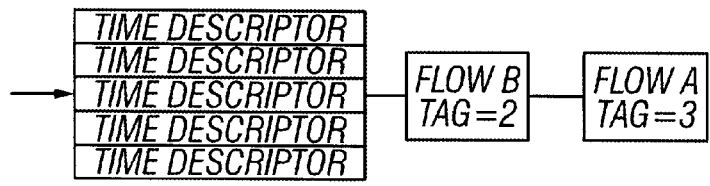

In FIG. 13B, a WRR request is again submitted at the next active time descriptor to arbitrate emission for flow A and flow B. Both flow A and blow B have the same numerical tag value, but flow A is linked ahead of flow B because it has a lower increment. Flow A is therefore selected for emitting a cell and is relinked its increment I=1 of time descriptors forward, or in other words to the next subsequent time descriptor. The tag value for flow A is further increased by its increment I=1 to create a tag value of 3. Flow B which is not selected for emission is also relinked to the next sequential time descriptor with flow A. Because flow B has a tag value of 2, which is now lower than the tag value of 3 for flow A, flow B is now linked ahead of flow A as shown in FIG. 13C.

In FIG. 13C, a WRR request is again submitted to arbitrate the emission of flow A and flow B. Flow B which is linked ahead of flow A because it has a lower tag value is selected by the Inter-Flow WRR for emitting a cell. Flow B is then relinked its increment value I=2 of sequential time descriptors forward. The tag value for flow B is then increased by its increment value I=2 to create a tag value of 4. Flow A which is not selected for emission is then relinked to the next sequential time descriptor.

Figure 13D:
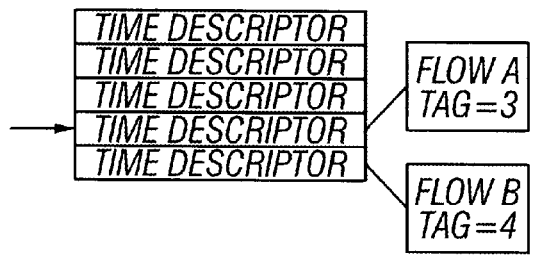

In FIG. 13D, no WRR request is placed because only flow A is linked to the active time descriptor. The scheduler allows flow A to emit a cell and relinks flow A to the next time descriptor since its increment is 1. The tag value for flow A is then increased by its increment I=1 to create a total value of 4. Although flow A now has a tag value equal to the flow B tag value, since flow A has a lower increment value, it is linked ahead of flow B to the same time descriptor.

Figure 13E:
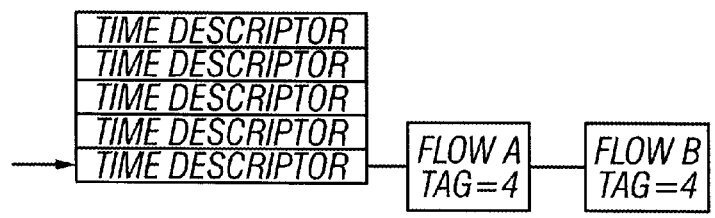

In FIG. 13E, a WRR request is submitted to arbitrate the emission of flow A and flow B. Flow A which is linked ahead of flow B because it has a lower increment value is selected by the Inter-flow WRR for emitting a cell and relinking continues as described above.

3. Traffic Class Support

The scheduler with a WWR as described above in accordance with the present invention can be tailored to accommodate different classes of traffic as described in the following sections.

i. Constant Bit Rate (CBR)

CBR requires dedicated bandwidth through the entire system, so CBR traffic is given highest priority in the scheduler system which includes an Inter-QoS WRR by setting its QoS weight to zero to minimize cell delay variation (CDV).

When an Inter-Flow WRR is used, CBR connections can be setup in one of two ways in terms of scheduling. For a first setup, a CBR flow can have its increment set to 1. This allows the CBR flow to be serviced with the highest priority as cells arrive. This scheme results in minimum transfer delay. For a second setup, the increment value for the CBR can be set to a higher value than 1 to account for the flow's specified rate. In this case, the flow will be output at a specified interval which will typically be greater than the interval when the increment is set to 1.

ii. Variable Bit Rate-Real Time (VBR-rt)

For the VBR-rt traffic, a Peak Cell Rate (PCR) associated with a QoS is programmed into the context memory. VBR-rt is policed by the ATLAS on ingress in the CP operating in an ATM Min Mode, or in an ATM Max Upstream Mode based on a SCR and a PCR, but VBR-rt flows are scheduled out of the scheduler system based on the PCR with a minimum CDV for the QoS.

The VBR-rt flows are scheduled only when traffic comes in, so if multiple flows are activated substantially at the same time into the scheduler system they can be linked to a single time descriptor, effectively over subscribing a link. With multiple VBRrt flows linked to a single time descriptor, scheduling is arbitrated using a WRR mechanism, but with all QoS and increment weights for the VBR-rt traffic being typically low or 0 value to minimize CDV, the WRR may not efficiently allocate bandwidth. With a link oversubscribed, ingress traffic can exceed available bandwidth, so a CDV impact can occur.

iii. Variable Bit Rate-Non Real Time (VBR-nrt)

VBR-nrt, like VBR-rt is scheduled out of the scheduler based on a PCR for a QoS value, but with a more relaxed CDV requirement. The VBR-rt traffic is, thus, typically weighted with greater values than the VBR-nrt traffic and can more effectively compete for bandwidth in the scheduler without exceeding a CDV threshold.

iv. Unspecified Bit Rate (UBR)

Like the VBR-rt and VBR-nrt, the UBR traffic has a PCR associated with a QoS, and no CDV requirement. For UBR traffic, different QoSs can be assigned with different increments, allowing a weighted relative distribution of available bandwidth.

V. Guaranteed Frame Rate (GFR)

GFR is a service class based on frames which contain a number of ATM cells, rather than individual ATM cells, so policing is performed on a frame basis. In accordance with the present invention two scheduler parameters are associated with a GFR flow, a Minimum Cell Rate (MCR) derived from a minimum frame rate and a maximum frame size, and a PCR. Traffic at MCR or more is guaranteed resulting in a guaranteed frame rate. Traffic above MCR, but less than PCR is treated like UBR, and competes for available bandwidth with other flows.

For the scheduler of the present invention, GFR flows are programmed using 2 QoSs. A first CBR QoS is programmed with the rate set to MCR. A second UBR QoS is programmed with an appropriate weight and its rate is set to PCR. Thus, when a flow becomes active, 2 links are entered in the scheduler, one CBR and one UBR.

V. Conclusion

Although the present invention has been described above with particularity, this was merely to teach one of ordinary skill in the art how to make and use the invention. Many other modifications will fall within the scope of the invention, as that scope is defined by the claims provided below.

What is claimed is:

1. A weighted round robin (WRR) engine process for arbitrating emission of asynchronous transfer mode (ATM) cells identified by flows, wherein each of the flows has a tag and a rate limiting increment (I), the process comprising the steps of:

identifying one of the flows for emitting an ATM cell which is linked first in a chain;

adding the increment (I) assigned to the one flow identified for emission to its tag value; and relinking flows in the chain based on their relative tag value.

2. A method of scheduling emission of asynchronous transfer mode (ATM) cells from an ATM cell queuing device comprising the steps of:

linking flows to time descriptors of a port shaper, wherein the flows each identify at least one of the ATM cells;

sequentially activating the time descriptors of the port shaper;

emitting one of the ATM cells identified by a given flow, and relinking the given flow from the active time descriptor to a subsequent time descriptor based on a weight assigned to the flow when the given flow is linked alone to the active time descriptor; and submitting a weighted round robin (WRR) process request to arbitrate emission of ATM cells when multiple given ones of the flows are linked to the active time descriptor, wherein the given flows are linked to QoS indicators, the WRR process comprising the steps of:

comparing tag values assigned to the QoS indicators, and if one of the QoS indicators has the lowest tag value of the tag values assigned to the QoS indicators, identifying the one QoS indicator for providing an ATM cell for emitting an ATM cell;

identifying a given one of a number-of the QoS indicators with a highest QoS value for emitting an ATM cell when tag values assigned to the number of QoS indicators are tied for having the lowest tag value; and adding a weight assigned to the QoS identified for emitting an ATM cell to its tag value.

3. A method of scheduling emission of asynchronous transfer mode (ATM) cells from an ATM cell queuing device comprising the steps of:

linking flows to time descriptors of a port shaper, wherein the flows each identify at least one of the ATM cells;

sequentially activating the time descriptors of the port shaper;

emitting one of the ATM cells identified by a given flow, and relinking the given flow from the active time descriptor to a subsequent time descriptor based on a rate limiting increment assigned to the flow when the given flow is linked alone to the active time descriptor; and submitting a weighted round robin (WRR) process request to arbitrate emission of ATM cells when multiple given ones of the flows are linked in a chain to the active time descriptor, wherein the given flows has a tag and a rate limiting increment, the WRR process comprising the steps of:

identifying one of the flows for emitting an ATM cell which is linked first in the chain;

adding the rate limiting increment assigned to the one flow identified for emission to its tag value; and relinking flows in the chain based on their relative tag value.

* * * * *